March 11, 1952  C. O. MITCHELL  2,588,647
APPARATUS FOR MAKING BELTS
Filed Oct. 28, 1948  5 Sheets-Sheet 1

INVENTOR.
CLYDE O. MITCHELL
BY Alfred W. Vibber
ATTORNEY

March 11, 1952 — C. O. MITCHELL — 2,588,647
APPARATUS FOR MAKING BELTS
Filed Oct. 28, 1948 — 5 Sheets-Sheet 2

INVENTOR.
CLYDE O. MITCHELL
BY
Alfred W. Vibber
ATTORNEY

March 11, 1952

C. O. MITCHELL 2,588,647

APPARATUS FOR MAKING BELTS

Filed Oct. 28, 1948

INVENTOR.
CLYDE O. MITCHELL
BY
Alfred W. Vibber
ATTORNEY

March 11, 1952 C. O. MITCHELL 2,588,647
APPARATUS FOR MAKING BELTS
Filed Oct. 28, 1948 5 Sheets-Sheet 5

INVENTOR.
CLYDE O. MITCHELL
BY
Alfred W. Nibber
ATTORNEY

Patented Mar. 11, 1952

2,588,647

UNITED STATES PATENT OFFICE 2,588,647

APPARATUS FOR MAKING BELTS

Clyde O. Mitchell, Clifton, N. J., assignor to Howe Machinery Company, Inc., a corporation of New Jersey Application October 28, 1948, Serial No. 56,983

5 Claims. (Cl. 219—19)

This invention relates to an apparatus for shaping elongated elastomeric bands of material. More particularly, the invention relates to the shaping of belt cores in the making of covered belts.

The invention has among its objects the provision of an apparatus for quickly and easily shaping, by a process involving melting of one or more surfaces, particularly the side surfaces, of an elongated member made largely of rubber-like elastomeric material by a process involving melting of the body of the member along such surfaces.

A further object of the invention resides in the provision of simple, easily operated, apparatus for shaping one or more surfaces of an elongated core such as that above indicated, for carrying out the core shaping steps of the method.

Yet another object of the invention lies in the provision of apparatus by which adjacent corners of a generally rectangular core blank may be skived to form the core of a V-belt, the skiving involving the melting of the core body along oppositely inclined paths longitudinally therethrough.

These and other objects of the invention will be more readily apparent in the following descriptions of preferred embodiments of the method and apparatus within the scope of the invention.

It is conventional practice to form the stock for V-belt cores as a wide endless belt having inner and outer layers of rubber-like materials with one or more interposed layers of reinforcing cores. Such wide belt, with the rubber-like material in uncured condition, is then cut up into a plurality of smaller endless belts of generally rectangular cross-section. Each such smaller belt is then skived on two adjacent corners so as to transfrom it to trapezoidal cross-section.

Such skiving operation, in the past, has been performed by sharp edged cutting tools such as those shown in the patent to Ambler, No. 1,958,122. Such cutting tools, for efficient operation, require lubrication, as with water. Such lubricant, however, has been found to be highly undesirable when forming belt cores having reinforcing materials therein which are markedly hygroscopic, such as rayon, since the cords in the belt, coming in contact with the lubricating water, absorb substantial quantities of it which they subsequently lose very slowly. Thus such cores, covered and vulcanized, react undesirably in the vulcanizing step, since the moisture therein is liberated during vulcanization, swelling the core and loosening the cover.

The apparatus of the present invention overcome such difficulty in the forming of belt cores having markedly hygroscopic reinforcing members therein, since the cutting operation employed herein requires no lubricant, and, in addition, provides a simple and efficient mode of shaping such belt cores in general, regardless of the character of the reinforcing material therein. Broadly, the method provides for the shaping of such belt cores by presenting to the core blank a melting and shaping element, the core and the element being traversed relative to each other, so that the element melts a path through the body of the core and longitudinally thereof. In addition to displaying the advantages above described, the invention further leaves the thus shaped core in ideal condition for the application of the cover, since the surface or surfaces so melted remain tacky for a substantial period.

The invention will be more readily understood by reference to the accompanying drawings in which.

Figure 1:
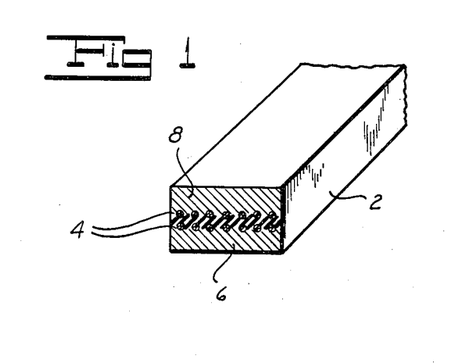
Figure 1 is a fragmentary view in perspective of a belt core blank, the end of such blank being shown in cross-section.
Figures 2, 3:
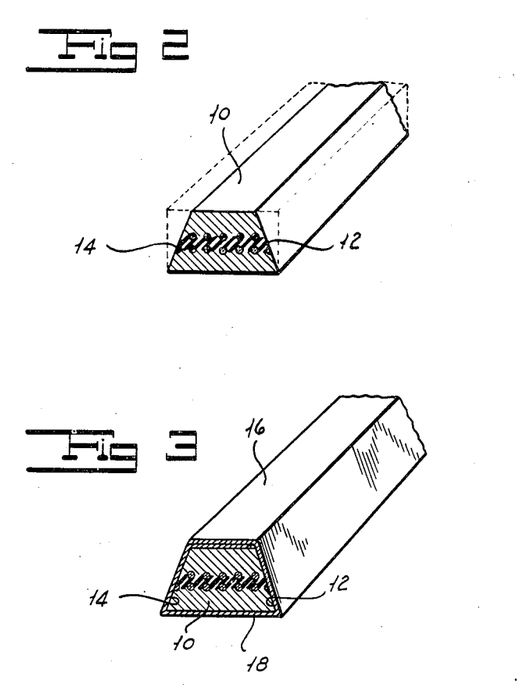
Figure 2 is a similar view of such core blank after it has been subjected to edge skiving operations in accordance with the invention.
Figure 3 is a similar view of the core shown in Figure 2 after a belt cover has been applied thereto.

Figures 1, 2, and 3 depict successive stages in the formation of a belt in accordance with the invention. In Figure 1 there is shown a blank for an individual belt core, such blank being designated by the reference character 2. The blank is made up by two layers, 6 and 8, of rubber or rubber-like material, between which is sandwiched and bonded to such layers a reinforcing structure generally designated 4. In this case the reinforcing structure is composed of two layers of reinforcing cords which may be made of rayon filaments twisted together, such layers being bonded at their interface by a thin layer of rubber cement as shown. The particular core blank shown is for a V-belt, the reinforcing structure 4 being located generally at the pitch line of such belt. As shown in Fig. 1, the core 2 is of rectangular cross-section, the height and width of the core being on the same order of magnitude.

Figure 2 depicts the core of Figure 1 after it has been subjected to an edge skiving operation in accordance with the invention. The shaped core designated 10 has had its two upper corners removed throughout the length of a core along oppositely inclined paths, so that the core is of trapezoidal shape and has the cut side surfaces 12 and 14. As has been indicated above and will be more particularly described below, the cutting of the core to form surfaces 12 and 14 is performed by heated core melting and shaping elements which are presented to the core and are traversed relative thereto along the length of the core so as to melt paths through the core body, removing the upper edges and shaping the body to the form shown.

Figure 3 shows a finished V-belt 16 incorporating the shaped core 10. Such belt is made by wrapping the core throughout its length with a flexible fabric covering 18 and by vulcanizing the assembled core and cover so as to cure the former and to secure the latter in place thereon. In order to insure adhesion between the cover and core, the confronting surfaces of either or both such parts, as well as the surfaces of the cover which overlap, are provided with a suitable adhesive such as rubber cement. When the belt shown in Figure 3 is formed sufficiently close in point of time to the skiving of the belt core in the manner described, so that surfaces 12 and 14 are still tacky, a superior belt results. This follows from the fact that such surfaces, which lie parallel to the side flanges of V-pulleys and are thus subjected to arduous service since it is largely through them that power is transmitted to and from the core of the belt, form a particularly strong bond with the cover when the cover is applied to such surfaces when the latter are still tacky.

Figure 4:
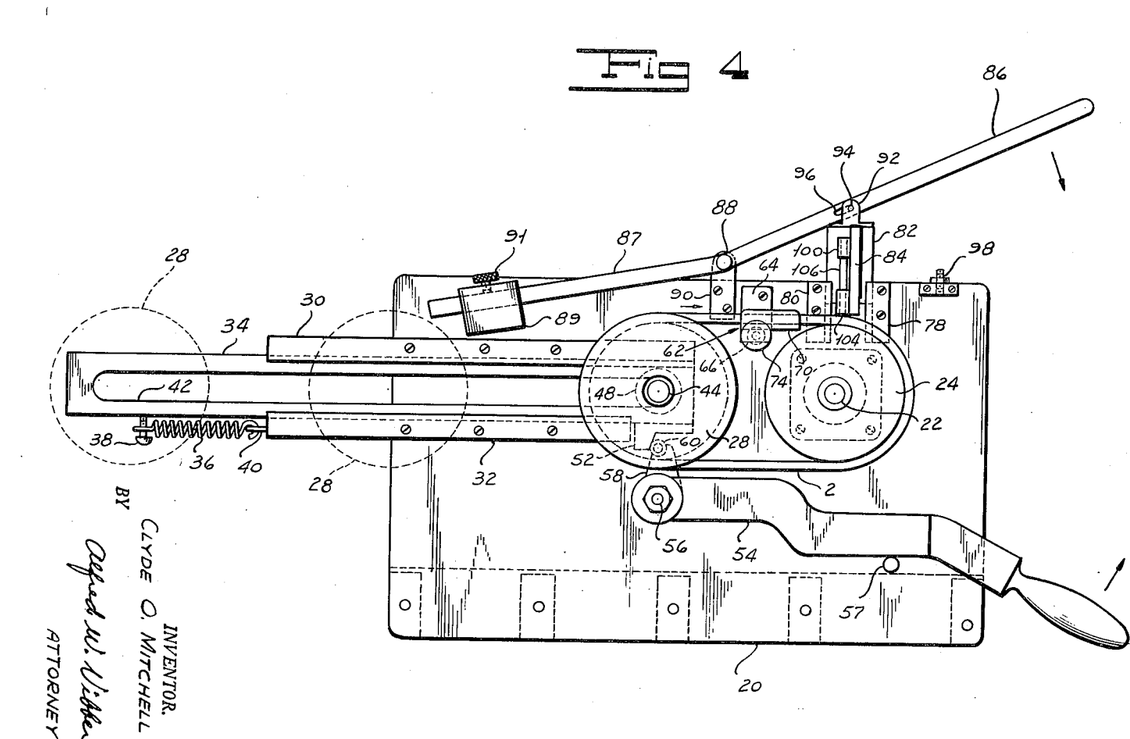
Figure 4 is a view in side elevation of a first embodiment of the cutting and skiving apparatus of the invention with a core to be shaped mounted thereon and with the belt core melting and shaping elements raised from contact with the core.
Figure 5:
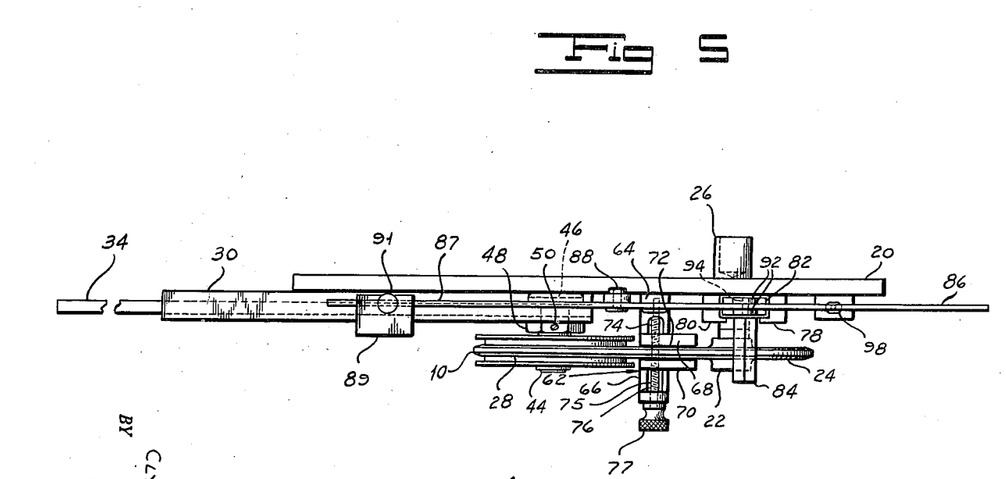
Figure 5 is a view in plan of the apparatus shown in Figure 4, the belt core being shown in the shape which it has after having been shaped by the apparatus.
Figure 6:
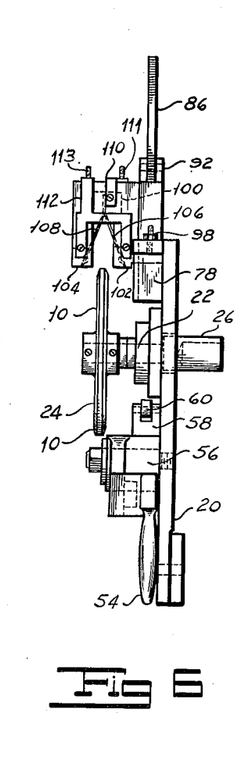
Figure 6 is a view in end elevation of the apparatus shown in Figure 4, the view being taken in a direction from right to left in Figure 4.

Figures 4, 5, and 6, depict one embodiment of the apparatus by which the core shaping operation indicated in Figure 2 may be performed. Such apparatus includes a vertical supporting plate 20 which is designed to be mounted upon a foundation such as a stand, not shown. Journaled in a bearing positioned on member 20, and extending through such member, is a shaft 22 on which is mounted, non-rotatively with respect to the shaft, the belt guiding and traversing pulley 24. Such pulley, which has its outer surface knurled, is designed to engage the inner surface of the endless core blank 2, as shown. Shaft 22 has on its outer end a drive connection 26 to which a driving means such as an electric motor, not shown, may be connected.

Confronting the pulley 24 and mounted parallel thereto in the same plane transverse to shaft 22 is the flanged idler pulley 28 which is mounted for travel toward and away from wheel 24 so that a belt core may be mounted over such pulleys, when pulley 28 is moved toward pulley 24, and that the belt core blank 2 is held in taut, accurately guided, position when pulley 28 is moved away from pulley 24 by means to be described. Pulley 28 is mounted, as shown, on the outer end of stub shaft 44 which is mounted on the elongated slide member 34, for adjustment longitudinally thereof, in the slot 42 which extends along the axis of the slide. The slide 34 is mounted for movement horizontally in the frame within guideways provided between the parallel top and bottom L-shaped guide members 30 and 32, respectively, bolted to the plate 20. Stub shaft 44 has a headed end 46 which fits on one side of the slot 42 and is large enough not to slip through the slot, with a neck portion which fits within the slot, and with an outer threaded portion which receives the nut or collar 48, as more clearly shown in Figure 5. Stub shaft 44 may thus be positioned at any desired location longitudinally of the slot 42, in order for the machine to accommodate belt cores of different lengths, and may be retained in such adjusted position by the tightening of the screw collar 48 which, as shown, is provided with a locking set screw 50.

The shaft 44 and the idler pulley 28 are adjusted so that when slide 34 is in its position fully advanced toward pulley 24 a belt core may be mounted over such pulleys. Tightening of the belt core so that it will be accurately guided and traversed on the pulleys is effected by means of the depending cam plate 52 mounted on the forward end of slide 34, the forward surface on such cam plate cooperating with the cam follower roller 60 mounted on the short, upwardly directed, lever 58. Such lever is connected to the horizontal operating lever 54 at the horizontal pivot pin 56 on which both are mounted. A stop member 57 projecting horizontally from the supporting plate 20 cooperates with the bottom surface of lever 58 to hold the latter in position when slide 34 is fully advanced. Counter-clockwise rotation of lever 54 (as seen in Figure 4) causes roller 60 and thus cam plate 52 and slide 34 to travel to the left, thereby tensioning the belt core 2. If desired, a detent means may be provided to hold lever 54 in such upper position, but such means is not necessary since the shaping of the core takes but little time.

The upper horizontal run of the belt core is guided as it approaches contact with the pulley 24 by the means generally designated 62. Such guide means includes the L-shaped supporting bracket 64 attached to the supporting plate 20 as shown, the horizontal arm 66 of such bracket furnishing support and guidance horizontally for the two laterally adjustable L-shaped guide members 68 and 70 which between them furnish a guiding channel 72. Members 68 and 70 are moved toward and away from each other by means of the screw 76 provided with the operating knob 77 and with the oppositely threaded portions 74 and 75 cooperating with similarly threaded bores in members 68 and 70, respectively. The guide members are adjusted to the position shown, so that the vertical confronting surfaces of members 68 and 70 closely confine the belt core traveling between them, thus accurately presenting the core to pulley 24, above which is located the belt core shaping means.

The core shaping means of the embodiment of the apparatus of the invention shown in Figures 4, 5, and 6, includes two thin elongated electrical resistance members which are oppositely inclined at the same angles as those of the sides of the V belt to be produced. In this embodiment both elements are mounted at the same station and on the same slide, so as to be presented to the core and to perform both side shaping operations simultaneously. Above the pulley 24 and at the side thereof there is provided a vertical guideway on plate 20, the guideway being formed of the confronting L-shaped guide pieces 78 and 80 which are bolted to plate 20, as shown. Within such guideway is mounted the vertically reciprocated slide 82 which thus can be advanced toward or retracted from the belt core 2 in the portion of the travel of such core at the top of pulley 24. On slide 82, which may be made of metal, if desired, there is secured a vertically disposed, laterally projecting, electrically insulating plate 84, made, for example, of molded phenolic resin, on which are mounted the core shaping elements.

Slide 82 and plate 84 are reciprocated, as recited, by means of an operating lever pivoted on the horizontal pivot pin 88 supported on top of vertical member 90 affixed to plate 20. Such operating lever has an arm 86 forwardly of the pivot and an arm 87 integral therewith rearwardly of the pivot, arm 86 being connected to slide 82 by means of the pin 94 which extends through the upstanding parallel ears 92 on top of slide 82, and through the longitudinal slot 96 in arm 86, such arm fitting within ears 92. Oscillation of lever arm 86 thus causes reciprocation of slide 82. An adjustable stop member 98 is provided in a bracket mounted on plate 20, so that the fully advanced position of the slide, and thus of the shaping elements, may be adjusted relative to the belt core mounted on the device as shown.

The rear arm 87 of the slide operating lever carries a slidable counterweight 89 which may be held in the desired adjusted position longitudinally of the arm 87 by set screw 91, the inner end of which bears against the lever arm. Weight 89 is so adjusted that the lever arm 86, with the slide 82, is normally in its upper position, as shown in Figs. 4 and 5. Rotation of arm 86 is limited, in a counterclockwise direction, by engagement of pin 94 with the right-hand end of slot 96. The shaping elements, to be described, on slide 82 are thus held out of engagement with the belt core to be shaped until the operator depresses the forward lever arm 86.

The insulating plate 84 which is generally of V shape, is provided on its forward face with a top spacer block 100, likewise made of insulating material, and at the bottom, on the same face, with two spacer blocks 102 and 104, which are likewise electrically insulating. The bottom portion of plate 84 has a central cut out portion to allow the reception therein of the pulley 24 and the belt core carried thereby and to allow the diagonal spans of the two cutting elements 106 and 108 to be unobstructed by the plate in a direction longitudinal of the top reach of the belt core. Element 106 extends from block 100 to block 102 and element 108 extends from block 100 to block 104. The cutting elements are in the form of structurally stiff metal electrical resistance elements of relatively thick tape configuration, the broad surfaces of the tape extending generally parallel to the plane of the belt core but, as shown, at an angle thereto so as to define the desired side faces of a V belt. The rearwardly directed narrow surfaces of elements 106 and 108 are desirably provided with an edge, which may be dull, to facilitate their entry into, and their passage through, the belt core. The two cutting elements are joined at their upper ends and are connected at block 100 to a bus bar 110 carrying a terminal 111. At its lower end element 106 is connected to block 102 and at such location to one arm of the bifurcated bus bar 112, the element 108 being attached at the block 104 to the other arm of such latter bus bar. The upper portion of bus bar 112 extends upwardly adjacent the bus bar 110 and carries a terminal 113, so that terminals 111 and 113 may be connected by flexible electric leads to an electrical supply circuit, not shown. In such arrangement resistance elements 106 and 108 are connected in parallel in such circuit.

The belt core 2 to be skived is mounted on the machine with the slide 82 in raised position, as shown in Figure 4. When the core has been mounted and tensioned, and after the pulley 24 has been placed in rotation, slide 82 carrying the shaping elements, as described, is then brought downwardly by manipulation of lever 86 so that elements 106 and 108 engage core 2 at its upper two corners. The belt core continues its travel past the shaping elements 106 and 108, which have been heated to core melting temperature and are usually at least at red heat, the elements removing the upper two corners of the belt core, each by an operation which involves melting such core along a path through the body of a core and parallel to the length thereof, the belt core so skived being shown at 10 in Figures 5 and 6.

The amount of material removed from the core at such two corners, for any given angle between the elements 106 and 108, may be varied by the setting of the stop member 98. In this embodiment of the apparatus it is preferred that, when a different angle between the side surfaces of the V belt core is desired, a different slide 82 with the elements 106 and 108 disposed thereon at such different desired angle be substituted for that shown. Such substitution is readily made, since it requires only the disconnection of the electrical leads from bus bars 110 and 112 and the removal of the pin 94 from ears 92 and lever 86, followed, of course, by connection of such elements when the substituted slide has been put in place.

Figures 7, 8:
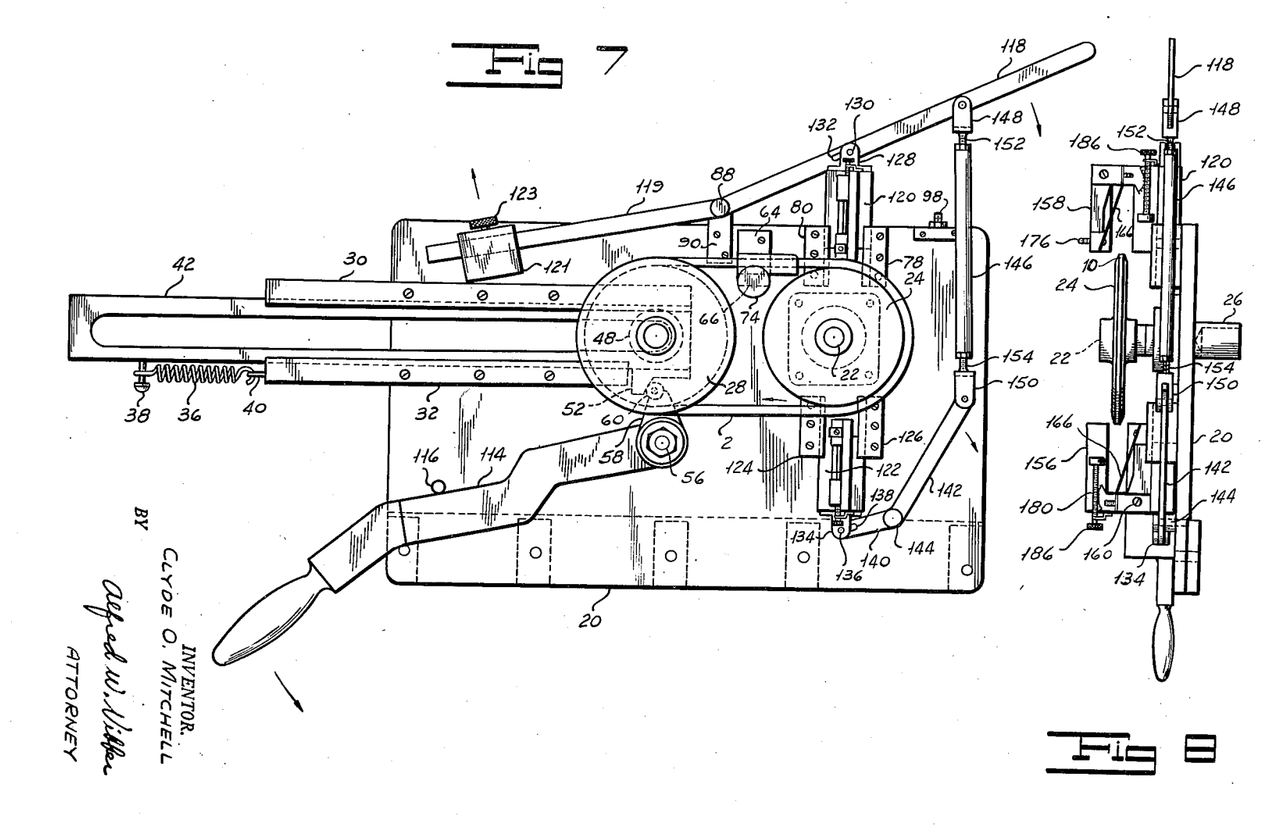
Figure 7 is a view in side elevation of a second embodiment of the cutting and skiving apparatus of the invention, a core to be shaped being mounted thereon, the core shaping elements being retracted from contact with the core.
Figure 8 is a view in end elevation of the apparatus of Figure 7, the view being taken in a direction from right to left in Figure 7, but with the core in shaped condition after having been operated upon by the apparatus.

In Figures 7 and 8 there is shown an alternative construction of the core shaping apparatus of the invention. The apparatus of the second embodiment differs from that described above and shown in Figures 4 to 6, inclusive, mainly by providing two core shaping element supporting slides, each carrying a shaping element, such slides being displaced a substantial distance from each other around the path of the belt core. With the exception of such modification in structure of the cutting and shaping element supporting and traversing means and except for a change of configuration of the belt tensioning lever, the parts shown in Figures 7 and 8 are the same as those shown in Figures 4 to 6, inclusive. Accordingly, the parts of the apparatus shown in Figures 7 and 8 which are the same in structure and function as those shown in Figures 4 to 6, inclusive, are designated by the same reference character.

The belt tensioning lever 114 in the second described embodiment extends from the pivot member 56 to the left in Figure 7. Such lever is connected to the upwardly directed cam roller carrying lever 58. A stop member 116 extends outwardly from supporting plate 20 to cooperate with the upper surface of lever 114 to prevent travel of such lever past the position in which pulley 28 is fully advanced. The belt core, mounted on pulleys 24 and 28 in the manner above described, is tensioned in the second embodiment of the apparatus by moving lever 114 downwardly, that is counter clockwise as it is shown in Figure 7.

In such second embodiment the apparatus is provided with a top slide 120 and a bottom slide 122, both reciprocable vertically. The means providing support and guidance for slide 120 are the same as those shown and described in connection with the slide 82 in the first described embodiment. Slide 122 is similarly retained and guided by the two guideway forming members 124 and 126. Slide 120 is provided on its upper surface with the upstanding parallel ears 128 through which extends the cross pin 130. Such pin affords a sliding connection between slide 120 and the forward lever arm 118 by means of the longitudinal slot 132 in the latter through which the pin extends. A connecting mechanism between the top and bottom slides 120 and 122, respectively, is provided whereby both slides approach and retreat from the belt core at the same time and in the same amount. Such connecting mechanism includes the clevis 148 pivotally connected to lever arm 118 near the forward end of the latter, a tube 146 adjustably connected to the shank 152 of such first clevis, a second, lower, clevis 150, the shank 154 of which is adjustably connected to the tube 146, and a bell-crank lever pivotally supported on the horizontal stud 144 projecting from plate 20, such bell-crank lever having a first arm 142 pivotally connected to clevis 150, and a second arm 140 slidably connected to slide 122. Such sliding connection includes the vertical parallel ears 134 on the bottom of slide 122, the cross pin 136 between such ears, and the slot 138 arranged longitudinally of lever arm 140, pin 136 extending through such slot. The slides 120 and 122 are normally held in retracted position with respect to the belt core by means of the counterbalancing device consisting of the rearwardly directed lever arm 119 connected to lever arm 118, and the counterweight 121 slidably mounted upon arm 119 and retained in the desired position longitudinally thereof by the set screw 123.

The apparatus of the second embodiment is somewhat more flexible in its application than that first described since it allows the independent angular adjustment of each of the core melting and shaping elements, thereby eliminating the necessity for the substitution of such element carrying slides should it be required to form V belts having different included angles between their side surfaces. The mechanism by which such angular adjustment of the melting and shaping elements is accomplished is shown more clearly in Figures 9 and 10 which depict the upper slide 120. It is to be understood that similar mechanism is incorporated in the lower slide 122, as is generally indicated in Figures 7 and 8.

Figure 9:
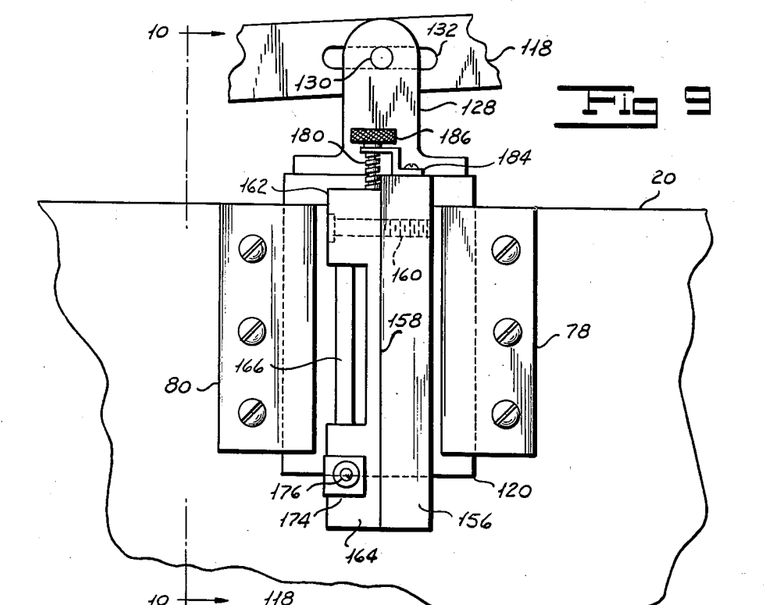
Figure 9 is an enlarged view in side elevation of the top slide for supporting the core melting and shaping element.
Figure 10:
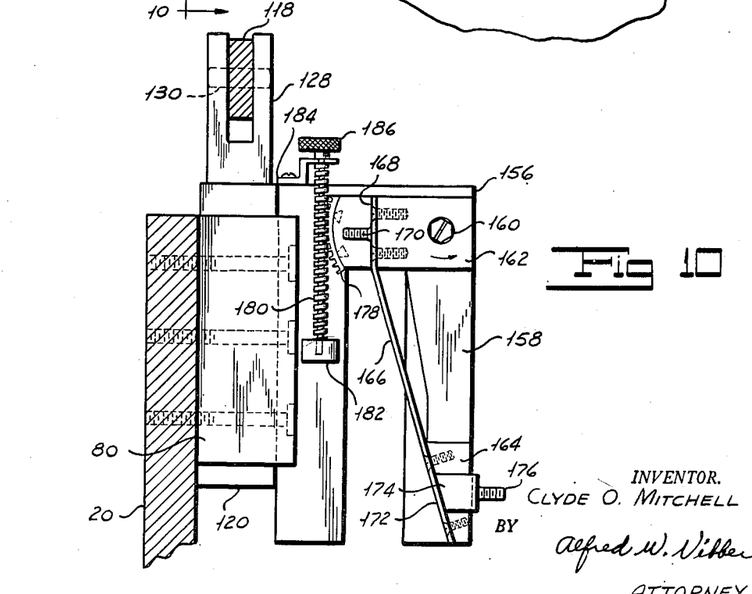
Figure 10 is a view in vertical cross section through the machine in the vicinity of such slide, such section being taken along the line 10—10 in Figure 9.

The slide 120 has attached to the face thereof, remote from plate 20, a transversely extending, electrically insulating plate 156 which is generally of inverted U-shape, as shown in Figure 10. The aperture between the legs of plate 156 receives a portion of the pulley 24 and the core to be shaped which is carried thereby, neither of which is shown in Figures 9 and 10. Supported on plate 156 in overlying and parallel relationship thereto is the melting and shaping element carrying member 158. Such member is mounted on plate 156 by means of the pivot member 160 so that part 158 may be adjusted angularly about pin 160 as an axis. The supporting member 158 has an upper section 162 and a lower section 164 of increased depth of section. The ends of the melting and shaping element 166 are supported on the left-hand surfaces of such thickened portions, as seen in Figure 10. At the upper end 168 such element is retained by screws threaded into portion 162 of member 158, such upper end of element 166 carrying a terminal 170. The lower end 172 of the element 166 is retained by means of screws threaded into portion 164, end 172 of the element being connected through the short bus bar 174 to the terminal 176. Connection of the element to an electrical supply circuit is made through flexible leads, not shown, from the circuit to the terminals 170 and 176.

The supporting member 158 and, consequently, the element 166, are adjusted to the desired angle with respect to the vertical, and are retained in such adjusted position, by means of a worm and segment gear arrangement. The gear segment 178 may be made of metal and applied as a separate piece which is interlocked with the left hand edge of member 158 (Figure 10) when the latter is molded. A worm 180 is supported vertically in meshing relationship with the gear segment 178 by means of the lower bearing 182, which may be formed as a part of plate 156, and in a bearing formed in the upper arm of the Z-shaped standard 184, such upper bearing retaining the worm against axial movement. Rotation of the worm by knurled knob 186 will be seen to cause the segment 178 and member 158, and thus the melting and shaping element 166 carried thereby, to change their position angularly with respect to the vertical and thus with respect to the belt core which travels therepast.

Although the element to be shaped by the apparatus of the invention has been described in connection with the above preferred embodiments of the apparatus as being a belt core, and such core has been described as continuous, it will be apparent that within the broader aspects of the invention the apparatus is advantageous in the shaping of one or more surfaces of a band of material and that such band need not be continuous. As indicated, the apparatus is useful when employed in the shaping of elongated elements of rubber-like elastomeric material. In addition to natural rubber, such materials include a wide variety of elastomers, which, when belt cores are to be formed, will be heat curable. Examples of such latter materials are the following: Buna S, which is copolymerized butadiene and styrene; Perbunan, which is copolymerized butadiene and acrylonitrile in an aqueous emulsion; neoprene, which is polymerized chloroprene made by polymerization of chloroprene in emulsion; butyl, which is a copolymer of a butene and a diolefin; Thiokol R D, which is a copolymer of organic polysulfide, and Koroseal which is plasticized polymerized vinyl chloride.

Although I have disclosed preferred embodiments of an apparatus for making belts, it is to be understood that the invention is not limited thereto since such embodiments are illustrative only and the invention is capable of considerable variations as to details. The invention is therefore defined by the scope of the claims appended hereto.

I claim as new the following:

1. Apparatus for shaping elongated endless cores for covered V belts, said cores consisting largely of uncured rubber-like elastomer, comprising a fixed supporting structure, means to support and guide an elongated endless belt core of generally rectangular cross-section for travel in the direction of its length, said last named means comprising a first, fixed, guide sheave journalled on an axis on the supporting structure, a movable guide sheave mounted on the supporting structure for movement toward and away from the first guide sheave, the movable guide sheave being journalled on an axis which lies in a common plane with the axis of the first guide sheave, the movable guide sheave being movable toward and away from the fixed guide sheave to accommodate belt cores of different lengths, means for drivingly rotating at least one of the guide sheaves, means to move the movable guide sheave toward and away from the fixed guide sheave and to hold it in a predetermined position whereby to tension a belt core held on the two guides sheaves, and means for skiving the core to cut off the two adjacent outer corners of said core throughout its length during travel of the core about the sheaves, said skiving means comprising a guideway mounted on the fixed supporting structure of the device adjacent one of the guide sheaves, said guideway lying substantially normal to the belt core in its run adjacent the inner end of the guideway, a slide received in said guideway and movable toward and away from the belt core, means to move the slide in such directions, and cutting means mounted on the slide, said cutting means comprising two oppositely inclined elongated, thin, electrical resistance elements, said electrical resistance elements being disposed in the form of an inverted V, the plane in which such V lies substantially coinciding with the plane of the guideway normal to the longitudinal axis of the belt core, the outer ends of the respective electrical resistance elements at least substantially approaching each other, insulating means on the slide supporting such outer ends of the resistance elements, spaced apart electrical insulating supporting means at the inner portion of the slide supporting the inner spaced apart, ends of the electrical resistance elements, and an electrical supply circuit including the resistance elements therein.

2. Apparatus for shaping elongated endless cores for covered V belts, said cores consisting largely of uncured rubber-like elastomer, comprising a fixed supporting structure, means to support and guide an elongated endless belt core of generally rectangular cross-section for travel in the direction of its length, said last named means comprising a first, fixed, guide sheave journalled on an axis on the supporting structure, a movable guide sheave mounted on the supporting structure for movement toward and away from the first guide sheave, the movable guide sheave being journalled on an axis which lies in a common plane with the axis of the first guide sheave, the movable guide sheave being movable toward and away from the fixed guide sheave to accommodate belt cores of different lengths, means for drivingly rotating at least one of the guide sheaves, means to move the movable guide sheave toward and away from the fixed guide sheave and to hold it in a predetermined position whereby to tension a belt core held on the two guide sheaves, and means for skiving the core to cut off the two adjacent outer corners of said core throughout its length during travel of the core about the sheaves, said skiving means comprising a guideway mounted on the fixed supporting structure of the device adjacent the fixed guide sheave, said guideway lying substantially in a plane normal to the runs of the belt core between the sheaves, a slide received in said guideway and movable toward and away from the fixed guide sheave, means to move the slide in such directions, and cutting means mounted on the slide, said cutting means comprising two oppositely inclined elongated, thin, electrical resistance elements, said electrical resistance elements being disposed in the form of an inverted V, the plane in which such V lies substantially coinciding with the plane of the guideway normal to the longitudinal axis of the belt core, the outer ends of the respective electrical resistance elements being connected together, insulating means on the slide supporting such connected together outer ends of the resistance elements, spaced apart electrical insulating supporting means at the inner portion of the slide supporting the inner, spaced apart, ends of the electrical resistance elements, and an electrical supply circuit including the resistance elements therein.

3. Apparatus for shaping elongated endless cores for covered V belts, said cores consisting largely of uncured rubber-like elastomer, comprising a fixed supporting structure, means to support and guide an elongated endless belt core of generally rectangular cross-section for travel in the direction of its length, said driven means comprising a first, fixed, guide sheave journaled for rotation on the supporting structure, a second, movable, guide sheave mounted on the supporting structure and cooperating with the first guide sheave to hold an endless belt core and to traverse it over such sheaves, the axes of the two sheaves lying in a common plane, the movable guide sheave being movable toward and away from the fixed guide sheave to tension the belt held by the sheaves, means to move the movable guide sheave toward and away from the fixed guide sheave and to tension the belt held by the sheaves, and means for skiving the core to cut off the two outer adjacent corners of said core throughout its length during travel of the core over the sheaves, said skiving means comprising two guideways on the fixed structure of the device, one such guideway being located substantially normal to the path of travel of the belt core at one zone thereof, and the other such guideway being located substantially normal to the path of travel of the belt core at another zone thereof, a movable slide contained in and guided by each of the said guideways, means to move said slides in unison toward and away from the belt core in their respective zones, means for mounting on a first slide an elongated, thin, electrical resistance element, inclined to the first unskived side edge of the belt core in a first direction, means for mounting on the second slide an elongated, thin, electrical resistance element, inclined to the second unskived side edge of the belt core in the opposite direction from the inclination of the first electrical resistance element, the first electrical resistance element confronting a first outer corner of the belt core, and the second electrical resistance element confronting a second outer corner of the belt core, the electrical resistance elements being disposed at such angles to the respective unskived side edges of the belt core as to produce skived corners of the belt core of the desired angularity, the resistance element mounting means on the respective slides including means for insulating the opposite ends of the elements from each other and from the structure of the slides and the fixed supporting structure of the device, and an electrical supply circuit including the resistance elements therein.

4. Apparatus for shaping elongated endless cores for covered V belts, said cores consisting largely of uncured rubber-like elastomer, comprising a fixed supporting structure, comprising means to support and guide an elongated endless belt core of generally rectangular cross-section for travel in the direction of its length, said driven means comprising a first, fixed, guide sheave journaled on the supporting structure for rotation on a horizontal axis, means for drivingly rotating the fixed guide sheave, a second, movable, guide sheave mounted on the supporting structure and cooperating with the first guide sheave to hold an endless belt core and to traverse it over such sheaves, the second, movable, sheave being journaled on a horizontal axis, the axes of the two sheaves lying in a common horizontal plane, the movable guide sheave being movable toward and away from the fixed guide sheave to tension the belt held by the sheaves, means to move the movable guide sheave toward and away from the fixed guide sheave and to tension the belt held by the sheaves, belt core guiding means for the run of the belt approaching the fixed guide sheave, said guiding means including means on each side of the belt core presenting guiding surfaces for engagement with the opposite side surfaces of the core, and means for skiving the core to cut off the two outer adjacent corners of said core throughout its length during travel of the core over the sheaves, said skiving means comprising two vertical guideways on the fixed structure of the apparatus, one such guideway being located above the fixed sheave and the other such guideway being located below the fixed sheave, the axis of the guideway substantially coinciding with the vertical plane containing the axis of the fixed guide sheave, a vertically movable slide contained in and guided by each of the said guideways, means to move said slides in unison toward and away from the fixed sheave, said last named means including a connecting linkage between such lever and the top and bottom slides, whereby the slides move as described, means for mounting on a first slide an elongated, thin, electrical resistance element, inclined to the vertical in a first direction, means for mounting on the second slide an elongated, thin, electrical resistance element, inclined in the opposite direction from the vertical from the inclination of the first electrical resistance element, the first electrical resistance element confronting a first outer corner of the belt core, and the second electrical resistance element confronting a second outer corner of the belt core, the electrical resistance elements being disposed at such angles to the vertical as to produce skived corners of the belt core of the desired angularity, the resistance element mounting means on the respective slides including means for insulating the opposite ends of the elements from each other and from the structure of the slides and the fixed supporting structure of the device, the resistance element mounting means on each slide including means for adjusting the element angularly with respect to the vertical, said angle being measured in a plane containing the element and extending at right angles to the run of the belt core adjacent which the slide is located, and an electrical supply circuit including the resistance elements therein.

5. Apparatus for shaping elongated endless cores for covered V belts, said cores consisting largely of uncured rubber-like elastomer, comprising a fixed supporting structure, means to support and guide an elongated endless belt bore of generally rectangular cross-section for travel in the direction of its length, said last named means comprising a first, fixed, guide sheave journalled on an axis on the supporting structure, a movable guide sheave mounted on the supporting structure for movement toward and away from the first guide sheave, the movable guide sheave being movable toward and away from the fixed guide sheave to accommodate belt cores of different lengths, means for drivingly rotating at least one of the guide sheaves, means to move the movable guide sheave toward and away from the fixed guide sheave and to hold it in a predetermined position whereby to tension a belt core held on the two guide sheaves, and means for skiving the core to cut off one of the two adjacent outer corners of said core throughout its length during travel of the core about the sheaves, said skiving means comprising a guideway mounted on the fixed supporting structure of the device adjacent one of the guide sheaves, said guideway lying substantially normal to the belt core in its run adjacent the inner end of the guideway, a slide received in said guideway and movable toward and away from the belt core, means to move the slide in such directions, means for mounting on said slide an elongated, thin, electrical resistance element, inclined to the unskived side edge of the belt core adjacnt which it lies so as to produce a skived corner of the belt core of the desired angularity, the resistance element mounting means on the slide including means for insulating the opposite ends of the elements from each other and from the structure of the slide and the fixed supporting structure of the device, and an electrical supply circuit including the resistance element therein.

CLYDE O. MITCHELL.

REFERENCES CITED

The following references are of record in the file of this patent:

UNITED STATES PATENTS

| Number | Name | Date |
|---|---|---|
| 1,445,992 | Cameron | Feb. 20, 1923 |
| 1,724,208 | Lewis | Aug. 13, 1929 |
| 1,958,122 | Ambler | May 8, 1934 |
| 2,035,138 | Maxfield | Mar. 24, 1936 |
| 2,086,238 | Platt | July 6, 1937 |
| 2,109,437 | Shook | Feb. 22, 1938 |
| 2,110,985 | Jacobson | Mar. 15, 1938 |
| 2,337,985 | Freedlander | Dec. 28, 1943 |
| 2,356,249 | Kremer | Aug. 22, 1944 |
| 2,430,496 | Dodge | Nov. 11, 1947 |
| 2,437,295 | Eastwood | Mar. 9, 1948 |
| 2,484,619 | George | Oct. 11, 1949 |